United States Patent Office 2,984,119
Patented May 16, 1961

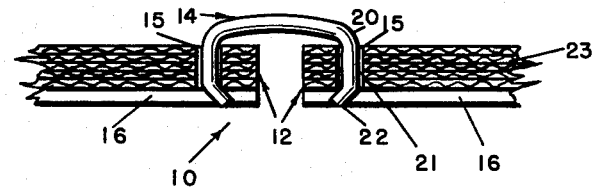
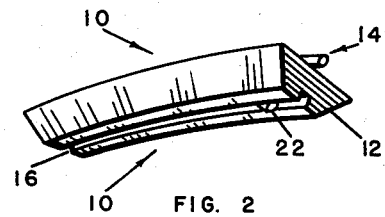
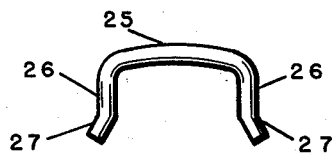
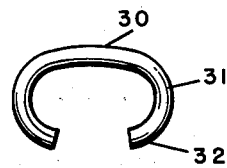
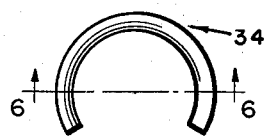

2,984,119

SPLICED POWER TRANSMISSION BELTING

George H. Jenkins III and Edward Joseph Zahn, Denver, Colo., assignors to The Gates Rubber Company, Denver, Colo., a corporation of Colorado Filed Apr. 18, 1958, Ser. No. 729,304

3 Claims. (Cl. 74—231)

This invention relates to an improved open end, spliced power transmission belt; and is more particularly related to a novel and unique hook arrangement for use on open end belting, together with the construction and arrangement of the belt itself.

It is common practice for either conveyor or power transmission purposes to form a groove, preferably along the bottom of the belt for burying the ends of a hook which is utilized to fasten the open end of a belt together. However, the hook or splice member is generally first inserted into hook receiving openings adjacent the free or open ends of the belt, then the hook ends are clamped or compressed into place along the groove. As a consequence, it has been necessary to handle the belt and form the desired hook arrangement after placement in the belt, therefore making it difficult to insure the proper angle of contact between the ends of the hook and the groove formation in the belt and also with the possibility of damaging the belt during crimping, particularly where inexperienced personnel are required to splice the belt together in the field. In addition, it has normally been the case that a stiff joint is formed between the hook and the belt itself, thus resulting in undue stress concentration adjacent the hook receiving opening and premature flex cracking across the belt. Moreover, it has been found that flex cracking generally is initiated at the bottom of the hook receiving openings where the sharp angled ends of the hook in the groove work against the bottom edge of the opening, and as the stresses imposed by the hook on the belt continually work against the belt in operation the belt will tend to crack transversely across the width thereof, thus causing early failure of the belt.

Moreover, to the best of our knowledge, it has also been common practice to utilize a hook wherein the groove contacting ends of the hook extend a substantial distance therealong, and, although they are at first hidden and secured tightly in the groove, upon flexing the hook ends will tend to bend outwardly, thus tending to snag objects in proximity to the belt, making it dangerous to work close to the belt while it is in operation, and contributing materially to premature flex cracking. It is accordingly a primary object of the present invention to provide a splice arrangement for open end belting which is adaptable to establish and permit optimum flexibility of the belt in operation, with minimum stress concentration at the point of engagement of the hook with the belting and at the same time enable easy, simple connection so as to avoid any obstruction during normal operation of the belt.

It is another object to provide an easy-to-install, preformed hook arrangement for use in combination with a belt which will eliminate subsequent crimping or bending once the hook is placed in the belt yet will provide optimum flexibility and life of the belt in operation.

It is still another object to provde for a safe, easy-to-install wire, pre-shaped connector for insertion through the open end section of a belt without the necessity of either crimping, clamping, or otherwise handling the hook or belt once in place wherein the hook is arranged and designed in such a way as to obtain optimum holding power for the belt in operation, together with optimum flexibility and increased life of the belt.

It is a further object to provide for a spliced belt arrangement wherein failure may be controlled to occur by normal wear instead of premature flex cracking, and wherein the belt and hook arrangement may be greatly simplified and more easily manufactured.

It is still a further object to provide for a belt designed in such a way that the tensile load imposed by the hook can be transferred uniformly to the tensile section of the belt, a hook member designed and preformed in such a way that the belt, particularly along the free ends thereof, is permitted to follow the contour of the surface on which it is riding and may hinge freely in a radial direction so as to prevent the development of high bending stresses in the belt adjacent the splice; and in addition, wherein the hook member is constructed and arranged in such a way to make it possible to slip the hook into place without bending or crimping once it is inserted into the belt, so that the splice function may be fully controlled during the manufacture of the belt and hook.

The foregoing and other objects and advantages are accomplished in accordance with the present invention broadly by the provision of a belt body which may be formed of conventional materials presently used in the construction of open end belts, and which makes possible the formation of a belt wherein the free ends of the belt may be made of the same construction and cross section as the remainder of the belt. Also, the hook design of the present invention broadly provides for a connecting length which is arched in such a way as to permit co-operation and conformity of the ends of the belt with the remainder of the belt and permits the ends to flex in a manner much the same as an endless belt, and moreover wherein the inserted ends of the connector are shortened and selectively preformed to establish the necessary holding power of the hook with the belt yet will co-operate with the groove formation to permit optimum flexing along the bottom, will not protrude from the bottom of the belt and will prevent premature flex cracking due to undue stress concentration adjacent the hook receiving opening in the belt.

Other objects and advantages of the present invention will become more apparent from the following description taken together with the drawing, in which:

Figure 1 is a lengthwise, sectional view of the free end section of a belt taken in the plane of the fastening hook, the latter being shown in elevation;

Figure 2 is a fragmentary, perspective view of a free end of the belt showing the relative disposition between the hook member and the belt, together with the design of a typical belt member;

Figure 3 is a front view of a modified form of hook member in which the end portions are turned away from the free ends of the belt;

Figure 4 is a front view of another form of hook in accordance with the present invention;

Figure 5 shows still another modification of a hook member adaptable for light duty applications; and Figure 6 is a sectional view taken on line 6—6 of Figure 5.

With more particular reference to the drawings, there is shown in Figures 1 and 2 a preferred form of the invention comprised broadly of a V-type belt member 10, shown here for the purposes of illustration only, having free, connector ends 12 which are spliced loosely together by means of a hook member 14. To permit proper insertion of the hook, each free end 12 of the belt member is provided with a hook receiving opening 15 adjacent the terminal end of the belt and extending vertically through the belt in relation to the thickness thereof so as to communicate with a groove 16 which may be extended longitudinally and centrally along the bottom of the belt.

To provide for optimum flexing and wear of the belt adjacent the spliced ends thereof, the splice or hook member 14 may be shaped prior to insertion to constitute a connecting bar or length 20, which may be made straight, but is preferably arched or generally convex, for spanning the free ends 12 of the belt, a shank or arm portion 21 for downward extension from either end of the connecting length 20 through each hook receiving opening 15 and a terminal or clasp end portion 22 extending into the groove 16 of the belt from each of the shanks at the edge of the hook receiving opening 15. As shown, the entire hook may be preformed since the ends 22 are shortened and bent to define a relatively low, gradual angle from the shank for easy insertion through the hook opening, yet securely positioned in the groove once in place. It will further be evident that, upon insertion, the ends 12 of the belt are free to follow the contour of the pulley surface upon which they are riding due to the arched connecting length 20 and the low angle given to the shortened end 22. In the preforming operation the shortened ends 22 may either be straight or curved inwardly, as will be seen in our modified forms. In this connection, the shortened ends 22 will extend toward the ends 12 of the belt at an angle just sufficient to prevent accidental displacement of the hook from the belt in operation and still permit the free ends 12 to shift, or work, easily in a radial direction in operation. The angle formed between the shortened end 22 and the shank portion 21 is therefore limited only in that as the lower edge of the hook receiving opening slides downwardly along the inner surface of the shortened end 22 the surface of the shank will contact the side of the hook receiving opening to prevent the belt from slipping over the lower end of the hook. In addition, in referring to the terminal ends 22 as being "shortened," they are given a length equal to, or slightly greater than, the depth of the groove 16 and, for instance, may extend beyond the bottom of the groove a distance equal to the upward displacement of the end when it is bent in the preforming operation. The hooks may thus be completely hidden in the groove and yet present a very low angle of curvature sufficient to prevent separation. Moreover, although it is desirable to dispose the ends 22 entirely within the groove such is not critical and, as will be noted from Figure 1, they may extend slightly beyond the groove without danger of causing an obstruction, due to their shortened length.

The belting 10, as mentioned, may generally be made up of any conventional materials and formed by any suitable processes and apparatus well known in the art. It has been found preferable, however, in forming open end belting of the present invention to construct the belt of several plies of a slit, square woven fabric which is either skimmed or treated with an oil resistant synthetic or natural rubber gum or latex. The plied up material is then cured in sheet form and cut to the desired belt dimensions, or cut to belt dimensions before cure and formed in the shape of the desired belt in a mold. Moreover, the channel or grove 16 which is designed to hold, protect and cover the hook 14 may either be cut or cured into the bottom of the belt. This channel or groove 16 is preferably extended completely around the bottom of the belt so that additional splices may be made without recutting a channel for the splice. The channel is also extended around the belt in order to make the belt more flexible for bending over small sheaves, and is designed, of course, to permit the hook splice to work freely at the joints. With the construction as described, the square woven fabric is provided with warp and fill threads of the same strength to attain proper hook holding power and at the same time prevent transverse squeezing of the belt which would tend to press the sides of the groove against the ends 22 of the hook 14. Thus, the belt construction does contribute materially to optimum flexibility of the splice.

Although the channel 16 is shown having an inverted U-shaped configuration, the primary restriction is only that it be dimensioned to conform to the size of the hook member 14 and is made in such a manner so as to prevent sidewall caving. Thus, the present invention is not confined to a definite channel formation and may be cut to any depth or width or contour.

The hook member 14 may also be made of any suitable material which will provide proper holding power at the location of the splice. However, particularly in heavy duty applications, it has been found preferable to make the hook of a high strength, drawn steel wire which will adequately handle stresses. It is to be further noted that the distance of the hook receiving openings from the terminal end of the belt is not critical, and is dictated largely by the desired length of the connecting bar, the spacing between the free ends 12 in spliced position, and the necessary distance from each end 12 in order to provide sufficient hook holding power. For insertion, the ends of the belt may be turned to lie side to side so that the hook extends across the sides of the belt rather than the ends of the belt. Each belt may then be rotated slightly to receive the end 22 in the corresponding hook receiving opening 15 and with a very slight push the ends can be forced through the opening into engagement with the edge of the groove 16. The ends 12 may then be turned to a facing position, as shown in Figure 1, with the ends 22 disposed in the groove 16.

As an example of the relative proportion and arrangement between the parts, which are here given for the purpose of illustration only and not limitation, the belt 10 may be comprised of eight layers of square woven fabric with the groove being of a depth equal to the thickness of two to three layers of the fabric, and is therefore relatively shallow. The hook may then be preformed, such as, by a bending or forging operation, having a length between the shanks sufficient to cause the free ends 12 to be spaced for free radial movement in spliced position. The shanks 21 are of a length equal to the hook receiving opening 15 and of a diameter about one-third smaller than the opening diameter, and the shortened ends 22 are just slightly longer than the depth of the groove so that under slight bending they will be completely hidden by the groove, and at the same time will extend along the groove 16 a distance equal to, or greater than, the difference in diameter between the opening 15 and shank 21 so as to prevent separation.

There is shown in Figure 3 a modification of the present invention wherein there is provided a connecting length 25 having shank portions 26 at each end of the connecting length and shortened end portions 27 diverging outwardly from the end of the shank 26. It is to be noted that the general configuration and angles between the parts correspond to that of our preferred form of invention with the exception of the shortened ends 27 which are turned outwardly and away from the free ends of the belt in place of the inwardly turned ends 22 of the preferred form. Again, due to the length and low angle of the ends 27, the ends may be hidden and in addition impart any stresses on the belt under bending against the main body of the belt and away from the free ends.

Another modified form is illustrated in Figure 4, wherein a C-shaped hook member 31 is provided including an arched connecting length 30, curved shank members 31 forming a continuation of the connecting length 30, together with shortened end portions 32 adapted to extend into the groove from the shank a distance and angle corresponding to the ends 22 of our preferred form. It will be noted further that the connecting link 30, shank 31 and shortened ends 32 describe an arc on a gradually increasing curve from the connecting length 30 to the shortened end 32 respectively. In this way, the modified hook of Figure 4 may be inserted into position in the belt of Figure 1 with the ends 32 flush with the groove 16 in much the same manner as the shortened ends 22. However, in this form it may be preferable to give the hook receiving opening a slight curvature so as to eliminate any stress imposed by the curved shank on the sides of the hook receiving openings 16.

In addition, various other generally C-shaped hook configurations may be envisioned within the scope of the present invention as, for example, a hook having a connecting length extending into the openings beyond the initial point of confinement in the openings, together with a shank continuing inwardly through each opening at a sharp angle from each end of the connecting length and terminating in the groove.

Still another modification of the present invention is illustrated in Figures 5 and 6, wherein a hook 34 may be of a semi-circular cross sectional configuration, as at 35. In this form, the hook 34 is more adaptable for light duty applications and may be made relatively thin so as to permit a smaller size opening 15 in the belt.

It is to be noted in the light of the foregoing description of our preferred and modified forms that all are based on the principle of utilizing preferably a slightly arched or curved connecting length, together with shortened ends preformed at a low angle for extension into a groove extending along the bottom of an open end belt. In this connection, it has been found in practice that the belt will fail due to wear caused by working of the sides of the shanks and shortened ends against the sides of the openings rather than by cracking, thereby preventing flex cracking along the bottom of the hook receiving opening 15. In other words, with the use of a shallow groove in which the shortened ends are free to flex yet not protrude beyond it, and with the free ends 12 free to flex about the hook, eventual failure is produced through the end of the belt due to gradual enlargement of the holes or openings 15, and along the groove and not by undue stress concentration adjacent the openings 15. Accordingly, by providing in each of the above forms a single piece hook which is preformed to the exact desired dimensions and angle and inserted into the belt without necessity of further forming or crimping and with the ends and shanks of the hook free to flex, also by shortening the ends with just enough curvature to contact a limited portion of the underside of the groove, it is found possible to relieve stresses adjacent the free ends of the belt, and at the same time permit greater flexing and longer life of the belt. And, in this respect, it has been found that our preferred form is particularly unique in carrying out the principles of the present invention.

It will therefore be understood that the foregoing description of preferred and modified forms of our present invention is given solely for descriptive purposes and in no way is intended to limit the scope of the present invention, as defined in the appended claims.

We claim:

1. In combination, a spliced power transmission belt having free end portions, a shallow channel extending along the bottom of said belt at least adjacent to each of the free ends thereof together with a shank receiving opening extending vertically through the thickness of the belt adjacent each of the free ends into communication with the channel; and a connector for splicing the free ends of said belt together, said connector including an arched connecting link spanning the free ends of the belt, straight shank members of uniform cross section at the ends of said connecting link extending vertically through the length of each respective shank receiving opening, and terminal end portions inclining downwardly from the free ends of the shank members at a low gradual angle into the channel, said terminal end portions terminating within the channel and being housed therein, the shank receiving openings each being of a diameter greater than the cross-sectional size of each respective shank therein and less than the distance of extension of each terminal end portion away from each shank member to provide for free radial movement of the free ends of said belt with respect to said connector so as to prevent accidental displacement of said connector from said belt in operation.

2. The combination according to claim 1 wherein said terminal end portions incline gradually into the channel toward one another for a distance substantially equal to the depth of the channel.

3. The combination according to claim 1 wherein said terminal end portions incline gradually into the channel in opposed directions to one another for a distance substantially equal to the depth of the channel.

References Cited in the file of this patent

UNITED STATES PATENTS

| 167,838 | Isaacs | Sept. 21, 1875 |
| 293,919 | Sprout | Feb. 19, 1884 |
| 338,565 | Smith | Mar. 23, 1886 |
| 1,035,963 | Heger | Aug. 20, 1912 |
| 1,923,542 | Keyes | Aug. 22, 1933 |
| 2,069,028 | Clark | Jan. 26, 1937 |

FOREIGN PATENTS

| 2,232 | Great Britain | of 1880 |
| 7,565 | Great Britain | of 1903 |
| 674,905 | France | Feb. 4, 1930 |
| 104,860 | Australia | Apr. 7, 1938 |
| 860,579 | Germany | Dec. 22, 1952 |